United States Patent [19]

Taylor

[11] 4,412,296

[45] Oct. 25, 1983

[54] GRAPHICS CLIPPING CIRCUIT

[75] Inventor: Stephen P. Taylor, Dunedin, Fla.

[73] Assignee: Smiths Industries, Inc., Clearwater, Fla.

[21] Appl. No.: 272,408

[22] Filed: Jun. 10, 1981

[51] Int. Cl.³ .............................................. G06F 3/153

[52] U.S. Cl. .................................... 364/521; 340/729; 364/522

[58] Field of Search ................ 364/521, 522; 340/723, 340/729

[56] References Cited

U.S. PATENT DOCUMENTS 3,602,702 8/1971 Warnock ............................ 364/522
4,146,925 3/1979 Green et al. ........................ 364/521
4,209,832 6/1980 Gilham et al. ...................... 364/521
4,291,380 9/1981 Rohner ................................ 364/522

*Primary Examiner*—Jerry Smith
*Attorney, Agent, or Firm*—Pollock, VandeSande & Priddy

[57] ABSTRACT

A circuit is provided which accepts digital position information from a graphics generator. This information serves as an input to a look-up table to determine whether the position information would cause any portion of a symbol from the graphics generator to be inside a clipping boundary, which boundary frames higher priority symbology. If this is found to be the case, the circuit excludes or clips the symbol portion that would otherwise interfere with the higher priority symbology.

5 Claims, 5 Drawing Figures

LOGIC CIRCUIT

LOGIC CIRCUIT

GRAPHICS CLIPPING CIRCUIT

FIELD OF THE INVENTION

The present invention relates to computer graphics apparatus, and more particularly to such an apparatus for clipping or blanking symbol portions which intrude into a defined clipping area containing high priority information.

BRIEF DESCRIPTION OF THE PRIOR ART

Computer graphics displays must be clipped to prevent portions of a display from appearing on a CRT, in areas it is not desired. For example, if a portion of a display requires numerical data and it is possible that another symbol might obscure such data, then it is desirable to exclude a portion of the symbol from the area around the numerical data.

The prior art has achieved this type of clipping by utilization of elaborate computer programs. Given the Cartesian end points of a line, it becomes necessary to determine the intersection of the line and the clipping boundary. Then, by using only new end points of the line outside the boundary to generate a vector, the clipping boundary and any symbology contained therein will remain unobscured. Although this type of approach operates generally satisfactorily, it involves the extensive use of computer programs to operate upon a great deal of data which results in slow data processing time.

An alternate prior art method has been to generate a line digitally, point-by-point, and then test each point against the boundary. In order to effectuate such computations, a relatively powerful computer and relatively large memory must be dedicated to the task, which is a great disadvantage.

BRIEF DESCRIPTION OF THE PRESENT INVENTION

The present invention includes circuitry which derives its input from a graphics generator, such as disclosed in U.S. Pat. No. 4,146,925, assigned to the assignee of the present application. This type of generator generates symbols, each of which may be a vector or conic figure. Unlike graphics generators which generate symbols by defining end points, the aforementioned patent breaks up a symbol segment into a plurality of strokes of constant length, regardless of orientation. These strokes are chained on the display, thereby producing the desired symbol in its entirety at a constant brightness.

Border detection circuitry is disclosed in the referenced patent and such circuitry operates satisfactorily but is restricted in two respects. First, it is only capable of generating a clipping boundary which is square or rectangular. Secondly, the circuitry disclosed in the patent is only capable of generating a single clipping boundary. Accordingly, with more complex displays requiring a wide variety of clipping border shapes and further wherein a multitude of such boundaries may be required for display on different parts of the screen, an improvement to the border detection circuitry is required. It is the present invention which addresses such an improvement.

The present invention is an improvement of the border detection circuitry disclosed in the mentioned patent. It is capable of generating curvilinear as well as linear border segments as produced by a graphics generator. Further, the present invention is capable of generating a multitude of clipping boundaries at different horizontal positions across the CRT screen.

Positional information is fed from the graphics generator to the circuit of the present invention so that this input information may address a look-up table to determine whether a conflict exists between certain portions of the symbol to be displayed and an area in which high priority symbology is to be displayed. If a conflict is determined to exist, the circuit clips the portion of the symbol that would otherwise obscure the high priority information.

The present invention incorporates standard logic hardware which advantageously cooperates with data obtainable from a graphics generator, as referenced, to enable clipping with far less computer strength and memory than required by prior art approaches. Further, the present invention is capable of clipping unwanted obscuring display sections at a high speed to enhance the quality of a display.

The above-mentioned objects and advantages of the present invention will be more clearly understood when considered in conjunction with the accompanying drawings, in which:

DETAILED DESCRIPTION OF THE INVENTION

Figure 1:
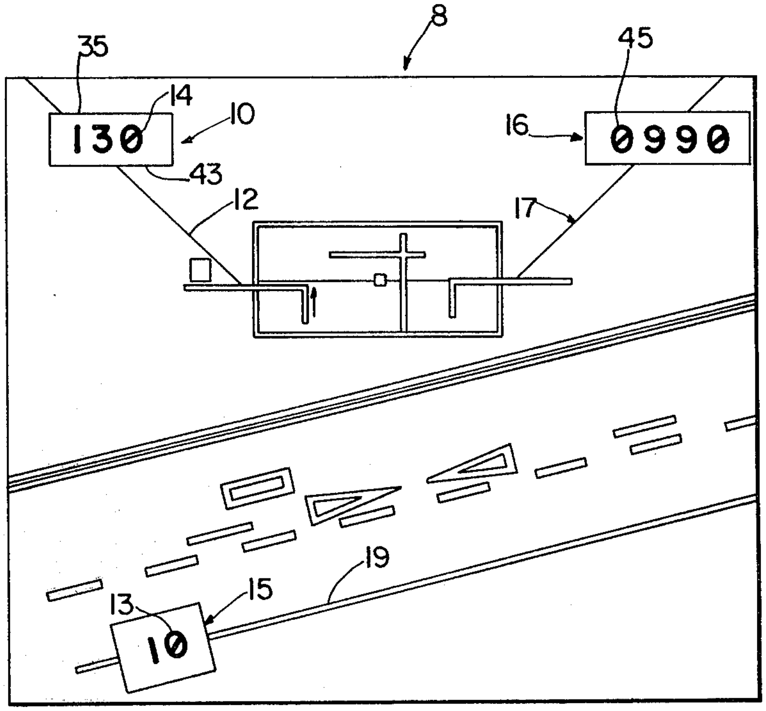
FIG. 1 is a view of an aeronautical display on a CRT screen wherein certain display symbols are clipped so as to prevent obscuring of high priority numerical data.

FIG. 1 is an illustration of a CRT screen including a number of aeronautical symbols which have been displayed thereon. The CRT screen is generally indicated by references numeral 8 and for purposes of illustration the screen 8 displays a trapezoidal figure having edges 12 and 17 intersecting darkened clipping boundaries 10 and 16. These boundaries respectfully include numerical data as signified by characters 14 within area 10. It is assumed, for purposes of explaining the present invention, that the numerical data within boundaries 10 and 16 are of relatively high priority and must not be obscured in the area where the trapezoidal figure overlaps. In order to achieve this, the trapezoidal symbol must be clipped to prevent the overlapping portions thereof from appearing within area 10. Thus, regardless of the symbol movement on the CRT, the clipping boundaries 10 and 16 are permanently described and will remain in the illustrated locations so that numerical data may be displayed without interference.

Figure 2:
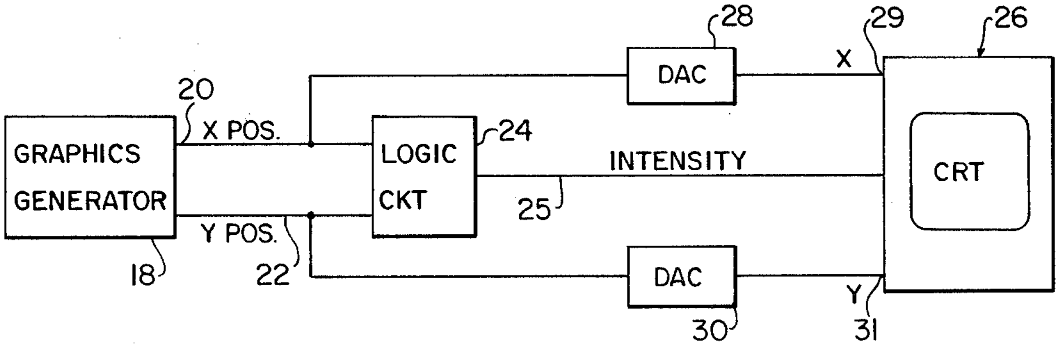
FIG. 2 is a basic block diagram of the present invention.

FIG. 2 is a basic block diagram of the present clipping circuit shown connected to a graphics generator 18 of the type described in the previously mentioned patent. The x position and y position data buses 20 and 22 transmit positional information in digital form to be converted to analog form so that a corresponding display may appear on the CRT 26. Undesirable information is clipped by logic circuit 24.

Specifically, information regarding the x position is fed in parallel to one input of logic circuit 24 and the input of digital-to-analog converter 28. The analog voltage appearing at the output of the digital-to-analog converter 28 is connected to the x deflection plate or coil terminal 29 of the CRT 26. Similarly, the y positional data is fed in parallel to logic circuit 24 and digital-to-analog converter 30. The analog form of the y positional information then appears at the output of converter 30 for connection to the y deflection plate or coil terminal 31 of CRT 26. The logic circuit 24 forms the heart of the present invention and is discussed in greater detail in FIG. 3. This circuit controls the intensity of the display at each particular point defined by the x-y positional data. Thus, if a particular x-y point is determined to be within a previously programmed clipping boundary, then the signal on line 25 will cause the display at this point to be blank. Conversely, if it is not within the clipping boundary, then the intensity signal on line 25 will be such as to cause the point to be displayed.

Figure 3:
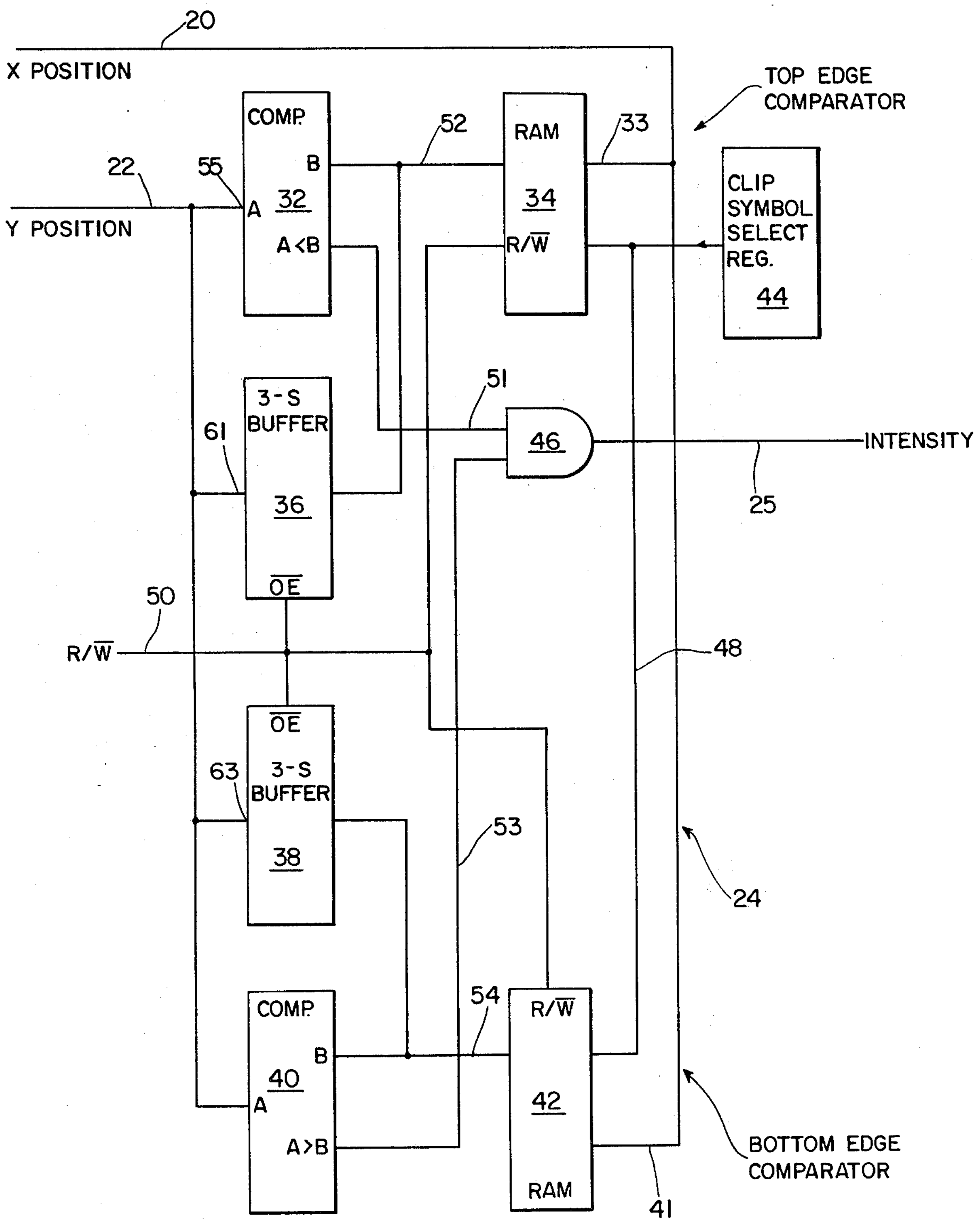
FIG. 3 is a logic diagram of a clipping circuit as incorporated in the present invention.

FIG. 3 is a logic block diagram for the logic circuit which was generally indicated by reference numeral 24 in FIG. 2. The primary purpose of the logic circuit is to store the clipping boundaries shown in FIG. 1, such as the upper edge 35 and lower edge 43 of boundary 10. A memory which may be ROM, RAM or equivalents thereof store data relevant to the boundaries. In a preferred embodiment, RAM 34 stores data corresponding to the upper boundary edge 35 of boundary 10. RAM 42 contains the data corresponding to the lower edge 43 of boundary 10. A preselected number of the most significant bits of the current x position of a point from graphics generator 18 addresses RAM 34 via data bus 20. At this particular address is stored the corresponding y position of the upper edge 35. The y position data is fed to comparator 32, via lead 52. The comparator will determine whether the y position, fed to comparator 32 from the graphics generator, along data bus 22, is above or below the y position stored in RAM 34. If it is above the stored position, then the y position is outside the clipping boundary and any symbol data being generated from the graphics generator is unclipped. When the y position data is below the stored value, it may be inside the clipping boundary and may be clipped. Similarly, a comparison is made relative to the bottom edge of the boundary 10. Thus, RAM 42 contains the y positional data for the lower edge 43 of boundary 10 and RAM 42 is addressed, at input 41, with the preselected most significant x position bits, along data bus 20. The corresponding stored y position bits are compared, in comparator 40, with the preselected most significant y position bits, from the graphics generator, appearing along data bus 22, as an input to comparator 40. If the graphics generator y positional data is above the lower edge 43 and below the upper edge 35, it is inside boundary 10 so that the output lines 51 and 53 of corresponding comparators 32 and 40 furnish high logic levels to AND gate 46 thereby causing a high logic level to appear at the gate output line 25. This results in an intensity signal to CRT 26 (FIG. 2) which will blank or clip the particular positional information being currently generated by graphics generator 18.

In the preferred embodiment of the present invention, RAMs 34 and 42 contain data relative to clipping boundaries for every possible x position. Thus, RAMs 34 and 42 also contain the clipping boundary 16. Between boundaries 10 and 16, the RAMs contain data describing a null boundary where no clipping is required. This would be accomplished by setting the y boundary in RAM 34 lower than that in RAM 42, ensuring that no point in those areas is clipped.

In addition, RAMs 34 and 42 are sufficiently large to store data relative to more than the boundaries 10 and 16. Thus, another block of memory in RAMs 34 and 42 may be used to store data corresponding to boundary 15 (FIG. 1). Boundary 15 would be enabled at a different time than boundary 19 and 16, since lines 12 and 17 could not interfere with data 13 and line 19 could not interfere with data 14 and 45. This is the purpose of the clip symbol select register 44. In essence, this register is a conventional two-bit register which determines, in the illustrative case, whether boundary 10 or boundary 15 is to be employed at a particular time. Register 44 selects, via lead 48, the particular block in RAMs 34 and 42 storing the positional data relative to the desired boundaries.

A great advantage of the present invention resides in the fact that outputs from the graphics generator 18 may also be used to program RAMs 34 and 42 for the desired clipping boundaries. In order to accomplish this, the control line 50 is set to a low logic state so that the write mode is activated. This allows the y position outputs from the graphics generator, along data bus 22 to load input terminals 61 and 63 of corresponding three-state buffers 36 and 38. The y position data will then be written into corresponding RAMs 34 and 42, along leads 52 and 54. The RAMs 34 and 42 are switched to the write mode when the write signal, appearing along control line 50 is transmitted to the interconnected R/W input terminals of both RAMs. As a line or segment of lines are generated by the graphics generator 18, the RAMs are loaded with positional data from the graphics generator output on a point-by-point basis. When a particular line segment is written into the RAMs, another line segment or arc may be programmed on a point-by-point basis until the RAMs are filled. Thus, the three-state buffers 36 and 38 and corresponding RAMs 34 and 42 allow the clipping boundaries to be programmed using the same circuitry that generates graphics symbology.

Figure 4:
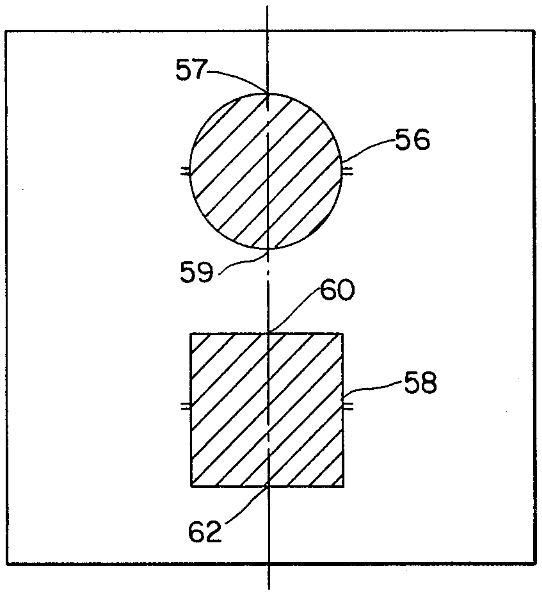
FIG. 4 is a schematic view of two clipping areas processed by the present invention.
Figure 5:
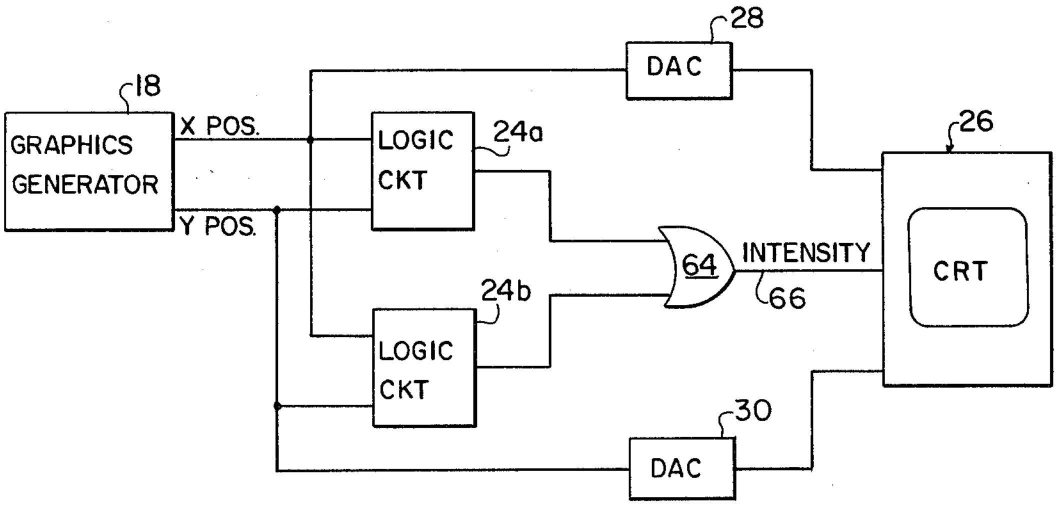
FIG. 5 is a logic diagram of a gating circuit as incorporated in the present invention.

In certain circumstances, it is desirable to generate two active clipping boundaries, one on top of the other as shown in FIG. 4. As will be noted, for the indicated vertical line there are four points of intersection, namely, 57 and 59, relating to boundary 56; and 60 and 62, relating to boundary 58. In order to handle such a situation, a single logic circuit such as 24 in FIG. 2 is inadequate. It would be necessary to have two such logic circuits such as **24*a* and 24*b* as shown in the block diagram of FIG. 5. FIG. 5 shows a block diagram corresponding to FIG. 2, but with two logic circuits instead of one. If a point generated by the graphics generator 18 is within boundary 56 or 58, then the output of OR gate 64 will be switched to a high logic level. This will be transmitted along the intensity control line 66 to CRT 26** so that appropriate clipping at a particular point is accomplished.

The present clipping circuit is capable of generating all of the boundary shapes which may be produced by the graphics generator 18. This would include any combination of straight lines, diagonal lines or any kind of arc segment. As will be appreciated, this means that any simple or complicated boundary, curve, linear or curvilinear may be generated as a clipping boundary.

It should be understood that the invention is not limited to the exact details of construction shown and described herein for obvious modifications will occur to persons skilled in the art.

I claim:

1. In a system for clipping graphic symbols on a CRT, within preselected linear or curvilinear clipping boundaries, a logic circuit for controlling CRT intensity, the logic circuit comprising:

input terminals at which first and second coordinate positional data regarding graphic symbols are presented;

memory means for storing a look-up table enabling correlation between first coordinates of points for corresponding second coordinate addresses, of preselected linear and curvilinear clipping boundaries;

comparator means connected at its input to the input terminals and the memory means for comparing an instantaneous first positional coordinate of the symbol at the input terminals with the coordinates in memory; and gating means, connected at its input to the output of the comparator means, for generating a (a) first intensity signal at the output thereof when a symbol point, at a moment of time, is located within a clipping boundary and (b) second intensity signal at the output thereof when a symbol point is located outside a clipping boundary.

2. The subject matter of claim 1 together with register means connected to the memory means for addressing one of several blocks in memory containing positional data for a corresponding number of clipping boundaries.

3. In a system for clipping graphic symbols on a CRT, within preselected linear or curvilinear clipping boundaries, a logic circuit for controlling CRT intensity, the logic circuit comprising:

input terminals at which first and second coordinate positional data regarding graphic symbols are presented;

memory means for storing a look-up table enabling correlation between first coordinates of points for corresponding second coordinate addresses, of preselected clipping boundaries;

storage buffer means connected in circuit between the first coordinate position input terminal and the memory means;

means connecting the output terminals of a graphics generator to the input terminals for writing first coordinate positional data into the memory from the buffer means as the memory is addressed by second coordinate positional data thereby establishing the clipping boundary look-up table during initialization of the system;

comparator means connected at its input to the input terminals and the memory means for comparing an instantaneous first positional coordinate of the symbol at the input terminals with the coordinates in memory;

gating means, connected at its input to the output of the comparator means, for generating a (a) first intensity signal at the output thereof when a symbol point, at a moment of time, is located within a clipping boundary and (b) second intensity signal at the output thereof when a symbol point is located outside a clipping boundary.

4. The subject matter set forth in claim 3 together with:

a CRT having an intensity control terminal connected to the output of the gating means, and x and y deflection control terminals;

the graphics generator connected to the input terminals for generating positional data; and first and second digital-to-analog converting means respectively connected between the input terminals and the x and y deflection control terminals.

5. The subject matter set forth in claim 4 wherein a plurality of logic circuits are connected at their inputs to the input terminals and at their outputs to a second gating means; and means for connecting an output of the second gating means to the intensity control terminal to enable clipping of graphic symbols within a corresponding plurality of clipping boundaries.

* * * * *